United States Patent Office

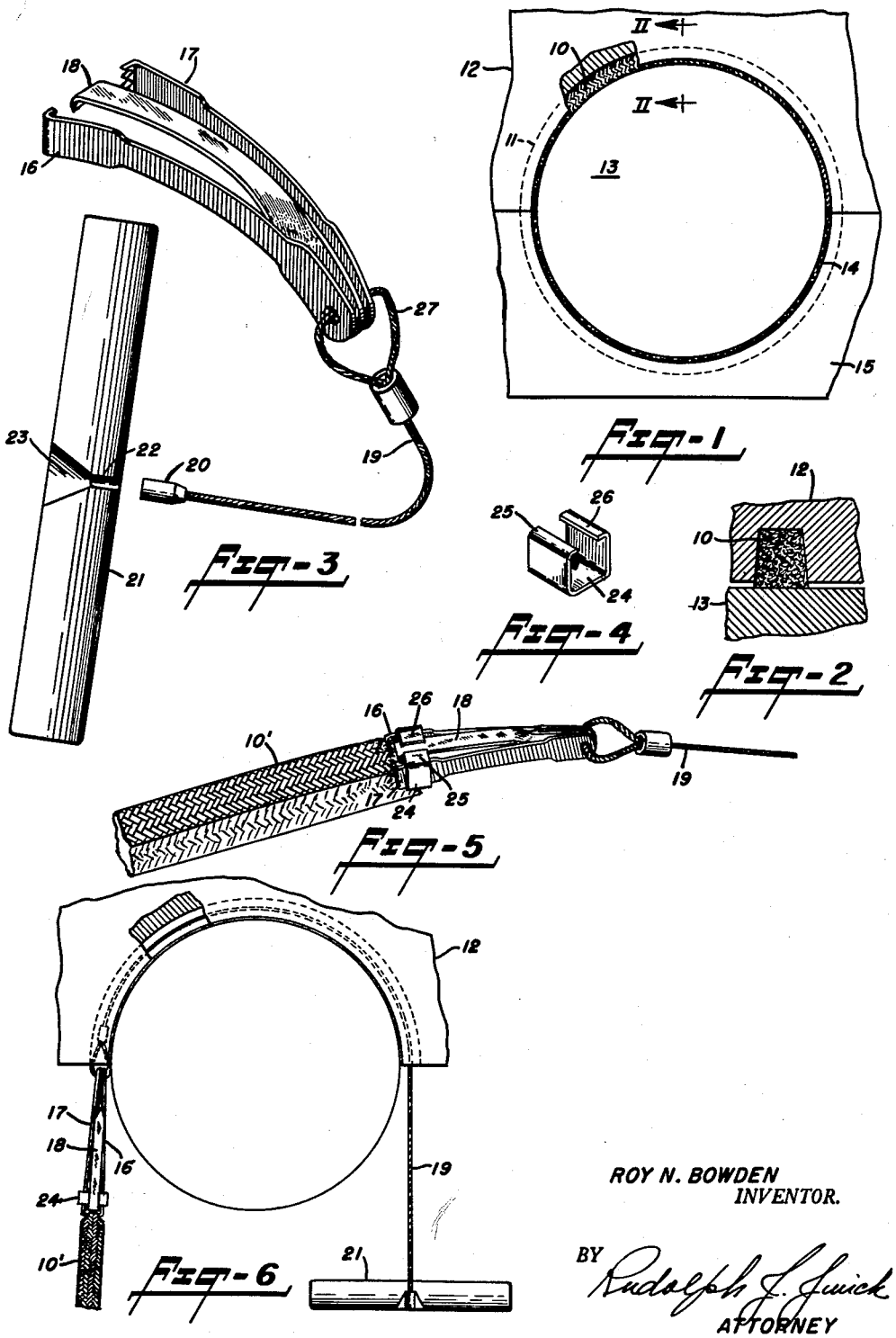

3,171,193
Patented Mar. 2, 1965

**3,171,193
SEAL PULLER TOOL**
Roy N. Bowden, 143 Washington St., Morristown, N.J.
Filed Feb. 28, 1962, Ser. No. 176,232
3 Claims. (Cl. 29—278)

This invention relates to a novel tool to facilitate the replacement of the rear main bearing oil seal of an engine.

The replacement of the rear main bearing oil seal of an internal combustion engine presently is attended by considerable difficulty and aggravation. The job, of course, can be done by removing the crankcase and main bearing caps and lowering the crankshaft, but this is time consuming and costly. Obvious advantages obtain when the job can be performed without lowering the crankshaft relative to the engine block. Toward this end, it is the present practice to use a tool commonly known as a Chinese finger, which is a tubular basket made of woven wire having a flexible cable attached to one end. An end of the new oil seal is inserted into the end of the finger and an axial tension is applied thereto. This causes a simultaneous axial elongation and radial contraction of the finger thereby gripping the seal. The greater the tensive force applied to the finger, the greater the gripping force thereof against the seal. The flexible cable is inserted completely through the seal channel whereby an end thereof is available to pull the new seal into position. The use of the Chinese finger necessitates lowering of all main bearing caps and the simultaneous use of both hands, one hand pulling upon the cable and the other hand maintaining the gripping action of the finger on the seal as the forward end of the seal is guided into the channel. Once the seal enters the channel, brute force is required to pull the seal into final position. This often results in several complications. A new seal is pre-cut to proper size and, generally, is ⅜–½ inch longer than the seal channel. Consequently, a portion of the finger still remains compressed within the seal channel after the seal has been pulled through the channel the required distance. Inasmuch as such portion of the finger is compressed between the seal and the channel walls, the removal of the finger is difficult. Generally, this requires considerable picking at the finger by means of a sharp-pointed tool and a simultaneous manipulation of the finger. An attempt to adjust the length of the seal end that initially is gripped by the finger, so that the finger will be free of the seal channel when the seal is properly inserted therethrough, results in an impositive gripping action, and, even in such case, the force required to pull the seal through the channel is such that often the seal inadvertently is pulled beyond the proper point. In either case the operation must be repeated. Additionally, the Chinese fingers are expensive and have a short operating life. The wire frays so that after 4 or 5 use cycles the device is no longer useful for the purpose.

A seal puller made in accordance with this invention overcomes the shortcomings of the Chinese fingers. The tool is of rugged construction and will last for many years. It is simple and convenient to use even by an unskilled person and its construction is such that it automatically disengages from the seal when the latter is pulled into proper position within the seal channel. Equally important is the fact that the use of the tool requires only the removal of the crank case and the single bearing cap associated with the oil seal to be replaced.

An object of this invention is the provision of a novel tool for use in the installation of the rear main bearing oil seal in an engine.

An object of this invention is the provision of a seal puller tool having cooperating members for gripping an end of a seal, adjustable means for retaining the members in seal-gripping relation on the seal and a flexible cable for pulling the members and the seal through a seal channel, said adjustable means being arranged for slidable removal from the said members as they enter the seal channel.

An object of this invention is the provision of a tool for use in slidably inserting an oil seal into proper position within a seal channel, said tool having gripping means for positive attachment to an end of the seal for the purpose of pulling the seal through the channel, and gripping means becoming automatically disengaged from the seal after the passage thereof through the channel.

An object of this invention is the provision of a seal puller tool comprising a pair of members having teeth for engaging opposite surfaces of a seal, a third member adapted partially to overlie the top surface of the seal, a flexible cable attached to the three members and a clamping member for retaining said pair of members in the seal-gripping relation until the forward end of the seal enters into the channel.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a fragmentary representation showing the rear main bearing oil seal of an internal combustion engine;

FIGURE 2 is a sectional view taken along the line II—II of FIGURE 1;

FIGURE 3 is a view of the seal puller tool made in accordance with this invention;

FIGURE 4 shows the separate clamping member;

FIGURE 5 illustrates the manner in which the tool is attached to an end of an oil seal; and FIGURE 6 shows the seal about to be pulled into position within the seal channel.

Reference, now, is made to FIGURES 1 and 2 wherein the rear main bearing oil seal 10 is shown disposed within a seal channel 11, formed in the cylinder block 12, and in surface engagement with the crankshaft 13. The front seal 14 is carried within a bearing cap 15. These seals are made of woven asbestos, are tightly compacted within their respective channels and serve to prevent oil from escaping onto the clutch.

The bearing cap 15 readily is removable and the replacement of the seal 14 presents no particular problem as this operation can be performed on a work bench. Replacement of the rear seal 10 is difficult and time consuming. The job can be done by removing all of the bearing caps and the crankshaft but this involves a day's labor by a skilled mechanic. The use of a Chinese finger facilitates the operation inasmuch as it is necessary only to lower the crankshaft a short distance to provide additional space for movement of the finger through the seal channel. It will be apparent, however, that a means for installing the new seal with the crankshaft in situ would reduce considerably the overall time required for this particular job. The tool now to be described serves this purpose.

FIGURE 3 illustrates the new tool, which comprises three hardened tool steel members 16, 17 and 18 loosely secured together by a flexible cable 19 having a loop passing through aligned holes formed in the individual members. The opposed members 16 and 17 are provided with inwardly-directed tooth portions for gripping an end of the oil seal, and are of arcuate shape. The center member 18 also is of arcuate shape and is twisted such that the lower end is parallel to the proximate ends of the other two members while the upper end portion lies in a plane substantially normal to that of the tooth portions. The free end of the member 18 is offset downwardly and provided with a sharp edge thereby providing an additional grip upon the seal when the tool is in use.

In FIGURE 3, the tool is drawn to a scale approximately 1½ times the actual size, whereas FIGURES 1 and 2 are drawn to a much smaller scale than actual size. Actually, the tool members 16, 17 and 18 lie on a curve having a radius substantially equal to that of the seal channel 11 shown in FIGURE 1, whereby the members can readily be pulled through the channel by means of the attached cable. The cable is formed of stranded steel wires and, although it is flexible, it is sufficiently rigid so that the free end, having the metal plug 20 secured thereto, can readily be slipped through the seal channel after the old seal has been removed. A wooden handle 21 is provided for attachment to the cable end to facilitate pulling the new seal into position. Such handle is provided with a transverse slot 22 communicating with a tapered bore 23 for receiving the cable plug 20 when the handle is attached to the cable.

Reference, now, is made to FIGURE 5 wherein the tool is shown firmly attached to the end of an oil seal 10'. It will be noted that the inwardly directed teeth of the members 16 and 17 are embedded in the seal and that the free end of the center member 18 overlies the upper surface of the seal. A firm gripping action on the cable is maintained by the clamping member 24 (see also FIGURE 4) which member also is made of hardened steel and has inwardly-directed, spaced tabs 25, 26. The clamping member is a separable unit and is slidably forced into the illustrated position from the direction of the cable loop 27. Further, its dimensions are such that the contained end of the seal is compressed to an extent such that the cross-sectional area taken along a plane proximate to the end of the center member 18 is substantially equal to that of the seal channel. Also, the tabs of the clamping member extend somewhat over the side edges of the center member 18. Once the seal end has been grasped, as shown in FIGURE 5, there is practically no chance of the seal becoming disengaged from the tool since the compressive force applied to the seal retains the clamping member in position. This is one important feature of the tool, as it is apparent the attachment of the tool to the seal can be done at any convenient location removed from the engine and the plug-carrying end of the cable can be inserted through the seal channel without fear of the seal and tool becoming separated.

After the plug-carrying end of the cable has been passed through the seal channel, the handle 21 is attached thereto, as shown in FIGURE 6. As the cable now is pulled through the channel, the clamping member 24 strikes the cylinder block and slides over the ends of the members 16, 17 and 18. By the time this happens, the said members are completely disposed within the channel whereby the gripping action of the toothed members on the seal is maintained. As the new seal is pulled further through the channel, the clamping member eventually slides off the seal. Now, when the seal-gripping members of the tool emerge from the other end of the channel, they are no longer restrained against movement laterally of the seal and the compressed portion of the seal expands whereby the members automatically become disengaged from the seal. This constitutes another important feature of the invention, since the described disengaging action prevents inadvertently pulling the seal an excessive extent through the channel.

The illustrated construction of the clamping member is preferred inasmuch as the slot in the upper wall thereof makes it possible to slip the clamping member over the assembled members 16, 17 and 18 at a point near the cable loop. It is apparent, however, that the clamping member can be a fully-closed loop without in any way interfering with the normal use of the tool. In this case, the plug-carrying end of the cable must be passed through the clamping member in order to position it over the gripped seal end.

As mentioned hereinabove, the new seal is pre-cut to a length ⅜–½ inch longer than the channel. If, then, the cable-gripping members of the tool are arranged so that the teeth thereof are approximately ¼ inch from the seal end, the seal will protrude about ¼ inch from each end of the channel when the tool automatically becomes disengaged therefrom. These protruding ends are compacted into the channel by means of a suitable tool, an operation which is common in this art regardless of the particular method used for installing the new seal.

The teeth on the opposed seal-gripping members can be relatively shallow since the clamping member, when in operative position, prevents undesirable disengagement with the seal. On the other hand, these teeth can each have a length exceeding one-half the seal thickness, in which case, the teeth would be offset from each other, along the seal axis.

In the construction of the tool, I prefer to make the central portions of the seal-gripping members of reduced width, as particularly shown in FIGURE 3. This provides a tool of increased utility as it is adapted for sliding movement along seal channels of different radii. However, when the tool is designed for use on a specific engine, the width of these members can be uniform as the arcuate side edges thereof will be made to conform to the radius of the particular seal channel.

Having now described my invention, those skilled in this art will be able to make various changes and modifications to adapte the tool to specific uses. It is intended that such changes and modifications shall fall within the scope and spirit of the invention as recited in the following claims.

I claim:

1. A tool for use in pulling an oil seal of generally rectangular cross-section through an arcurate channel presenting an entrance opening, said tool comprising,
    (a) a pair of separate seal-gripping members, each member comprising an elongated body portion having arcuate side edges, an inwardly-directed offset end formed into a tooth portion and a hole formed at the other end.
    (b) a flexible cable adapted for insertion through the channel,
    (c) means forming a loop at one end of the cable which loop passes through the holes formed in the seal-gripping members,
    (d) a handle removably attached to the other end of the cable, and
    (e) a tubular clamping member slidably positionable over the seal-gripping members thereby to retain the tooth portions thereof embedded in an end of the seal, said clamping member engaging the wall defining the said entrance opening and sliding over the seal as the latter is pulled through the said channel.

2. The invention as recited in claim 1, including a third seal-gripping member having a hole through which the said loop passes, and an offset end formed into a tooth portion and lying in a plane substantially normal to that of the offset ends of the other seal-gripping members.

3. The invention as recited in claim 2, wherein the tooth portions of the seal-gripping members lie in different planes when the holes of the members are in axial alignment.

References Cited by the Examiner

UNITED STATES PATENTS

| | | | |
|---|---|---|---|
| 1,392,339 | 10/21 | Kelly | |
| 1,546,523 | 7/25 | Walaschek | 24—123 |
| 1,620,928 | 3/27 | Walaschek | 24—123 |
| 2,591,925 | 4/52 | Erbe | 24—283 |
| 3,029,503 | 4/62 | Mayer | 29—283 |

WILLIAM FELDMAN, *Primary Examiner.*

NEDWIN BERGER, *Examiner.*